US008239336B2

(12) United States Patent
Le Roux et al.

(10) Patent No.: US 8,239,336 B2
(45) Date of Patent: Aug. 7, 2012

(54) DATA PROCESSING USING RESTRICTED BOLTZMANN MACHINES

(75) Inventors: Nicolas Le Roux, Cambridge (GB); John Winn, Cambridge (GB); Jamie Daniel Joseph Shotton, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 12/400,388

(22) Filed: Mar. 9, 2009

(65) Prior Publication Data
US 2010/0228694 A1    Sep. 9, 2010

(51) Int. Cl.
*G06F 15/78* (2006.01)
(52) U.S. Cl. ........................................ 706/25
(58) Field of Classification Search .................. None
See application file for complete search history.

(56) References Cited

U.S. PATENT DOCUMENTS

| 7,421,380 B2 | 9/2008 | Thiesson et al. |
| 2007/0198260 A1 | 8/2007 | Deng et al. |
| 2008/0010043 A1 | 1/2008 | Thiesson et al. |

OTHER PUBLICATIONS

Hinton, "Learning Mulitple Layers of Representation", 2007, Trends in Cognitive Sciences, vol. 11 No. 10, pp. 428-434.*
Chen et al., "Continuous Restricted Boltzmann Machine with an Implementable Training Algorithm", Jun. 2003, "Visual, Image, and Signal Processing", vol. 150 Issue 3, pp. 153-158.*
Ackley, "A Learning Algorithm for Boltzmann Machines", retrieved on Jun. 1, 2009 at <<http://papers.cnl.salk.edu/PDFs/A%20Learning%20Algorithm%20for%20Boltzmann%20-Machines_%201985-3542.pdf>>, Cognitive Science 9, 1985, pp. 147-169.
Chen, et al., "A Continuous Restricted Boltzmann Machine with a Hardware-Amenable Learning Algorithm", retrieved on Feb. 12, 2009 at <<http://www.ee.nthu.edu.tw/~hchen/pubs/icann2002.pdf>>, Department of Electronics and Electrical Engineering, University of Edinburgh, UK, 6 pages.
Chen, et al., "Continuous restricted Boltzmann machine with an implementable training algorithm", retrieved on Feb. 12, 2009 at <<http://ieeexplore.ieee.org/ielx5/2200/27364/01216825.pdf?arnumber=1216825, IEE Proc-Vis. Image Signal Process, vol. 150, No. 3, Jun. 2003, pp. 153-158.
Dai, et al., "BGMM: A Beta-Gaussian Mixture Model for Clustering Genes with Multiple Data Sources", retrieved on Feb. 12, 2009 at <<http://www.cs.tut.fi/~harrila/research/Dai_BGMM_WCSB.pdf>>, Department of Signal Processing, Tampere University of Technology, Tampere, Finland, 4 pages.

(Continued)

*Primary Examiner* — Jeffrey A Gaffin
*Assistant Examiner* — Paulinho E Smith
(74) *Attorney, Agent, or Firm* — Lee & Hayes, PLLC

(57) ABSTRACT

Data processing using restricted Boltzmann machines is described, for example, to pre-process continuous data and provide binary outputs. In embodiments, restricted Boltzmann machines based on either Gaussian distributions or Beta distributions are described which are able to learn and model both the mean and variance of data. In some embodiments, a stack of restricted Boltzmann machines are connected in series with outputs of one restricted Boltzmann machine providing input to the next in the stack and so on. Embodiments describe how training for each machine in the stack may be carried out efficiently and the combined system used for one of a variety of applications such as data compression, object recognition, image processing, information retrieval, data analysis and the like.

18 Claims, 6 Drawing Sheets

OTHER PUBLICATIONS

Freund, et al., "Unsupervised learning of distributions on binary vectors using two layer networks", retrieved on Jun. 1, 2009 at <<http://citeseerx.ist.psu.edu/viewdoc/download;jsessionid=4390682507A2E200170BE7E0BFE31B92?doi=10.1.1.29.5728&rep=rep1&type=pdf>>, Baskin Center for Computer Engineering & Information Sciences, University of California, Santa Cruz, Jun. 22, 1994, 41 pages.

Hinton, et al., "A fast learning algorithm for deep belief nets", retrieved on Jun. 1, 2009 at <<http://www.cs.toronto.edu/~hinton/absps/fastnc.pdf>>, to appear in Neural Computation 2006, 16 pages.

Hinton, et al., "Reducing the Dimensionality of Data with Neural Networks", Science, Jul. 28, 2006, vol. 313, pp. 504-507.

Hinton, "Products of Experts", retrieved on Jun. 1, 2009 <<at http://citeseerx.ist.psu.edu/viewdoc/download?doi=10.1.1.42.6271&rep=rep1&type=pdf>>, Gatsby Computational Neuroscience Unit, University College London, 6 pages.

Hinton, "Training Products of Experts by Minimizing Contrastive Divergence", retrieved on Feb. 12, 2009 at <<http://www.cs.toronto.edu/~hinton/absps/tr00-004.pdf>>, Gatsby Computational Neuroscience Unit, University College London, 2000, pp. 1-19.

Jojic, et al., "Epitomic analysis of appearance and shape", In Proc. of ICCV 2003, Nice, France, 8 pages.

Jojic, et al., "Learning Flexible Sprites in Video Layers", to be presented at IEEE Conference on Computer Vision and Pattern Recognition, Kauai, HA, Dec. 9-14, 2001, 9 pages.

Larochelle, et al., An Empirical Evaluation of Deep Architectures on Problems with Many Factors of Variation, appearing in Proceedings of the 24th International Conference on Machine Learning, Corvallis, OR, 2007, pp. 473-480.

Lee, et al., "Sparse deep belief net model for visual area V2", retrieved on Jun. 1, 2009 at <<http://www.stanford.edu/~hllee/nips07-sparseDBN.pdf>>, Computer Science Department, Stanford University, 8 pages.

Nair, et al., "Implicit Mixtures of Restricted Boltzmann Machines", retrieved on Feb. 12, 2009 at <<http://books.nips.cc/papers/files/nips21/NIPS2008_0935.pdf>>, Department of Computer Science, University of Toronto, Canada, pp. 1-8.

Osindero, et al., "Modeling image patches with a directed hierarchy of Markov random fields", NIPS 2007, pp. 1-8.

Salakhutdinov, et al., "On the Quantitative Analysis of Deep Belief Networks", retrieved on Jun. 1, 2009 at <<http://icml2008.cs.helsinki.fi/papers/573.pdf>>, Appearing in Proceedings of the 25th International Conference on Machine Learning, Helsinki, Finland, 2008, 8 pages.

Smolensky, "Information processing in dynamical systems: Foundations of harmony theory", In D.E. Rumelhart and J. L. McClelland (Eds.), Parallel distributed processing, vol. 1, chapter 6, 194-281. Cambridge: MIT Press, 1986.

Tieleman, "Training Restricted Boltzmann Machines using Approximations to the Likelihood Gradient", retrieved on Feb. 12, 2009 at <<http://icml2008.cs.helsinki.fi/papers/638.pdf>>, appearing in Proceedings of the 25th International Conference on Machine Learning, Helsinki, Finland, 2008, 8 pages.

Welling, et al., "Exponential Family Harmoniums with an Application to Information Retrieval", retrieved on Jun. 1, 2009 at <<http://www.ics.uci.edu/~welling/publications/papers/GenHarm3.pdf>>, 8 pages.

Welling, et al., "Learning Sparse Topographic Representations with Products of Student-t Distributions", NIPS, 2003, 8 pages.

* cited by examiner

DATA PROCESSING USING RESTRICTED BOLTZMANN MACHINES

BACKGROUND

A Boltzmann machine is a type of neural network comprising symmetrically connected nodes. The nodes are connected by weighted connections and each node has an associated bias value. During a learning process training data is presented to the network and a learning rule is followed to update the weights and bias values. The learning process involves repeatedly updating until the network reaches an equilibrium. Hidden nodes in the network are able to discover interesting features that represent complex regularities in the training data and these hidden nodes are often referred to as "feature detectors". The hidden nodes are those which are not input nodes or output nodes and there may be many layers of hidden nodes. Nodes which are not hidden are often referred to as visible nodes.

Restricted Boltzmann machines are a type of Boltzmann machine neural network without connections between the visible nodes and without connections between hidden nodes. There are no layers per se in a restricted Boltzmann Machine, but simply input and hidden units. Therefore training of restricted Boltzmann machines is much faster than training of regular Boltzmann machines comprising of connections between visible units and of connections between hidden units. The learning process in this type of neural network is generally much faster than for Boltzmann machines with many layers of hidden nodes.

Boltzmann machines (including restricted Boltzmann machines) are arranged to learn the distribution over the data presented to the visible units. In this way the network forms a representation of the data and hidden nodes in the network come to represent features of the data.

Restricted Boltzmann machines may be stacked in layers, using the hidden nodes of one as input for the next. The activations of the hidden nodes of one RBM may be used as the training data for the next RBM to efficiently learn many hidden layers. The resulting network is referred to as a deep belief network.

Such deep belief networks are used for many applications in data processing and a non-exhaustive list of examples is: data compression; data dimensionality reduction; object recognition; document retrieval; modeling gene expression data; modeling motion capture data; representing complex data.

In general it is desired to provide data processing systems using Boltzmann machines which represent complex data in an accurate and reliable manner and in which training may be carried out quickly, reliably and with stability.

The embodiments described below are not limited to implementations which solve any or all of the disadvantages of known data processing systems which use Boltzmann and restricted Boltzmann machines.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Data processing using restricted Boltzmann machines is described, for example, to pre-process continuous data and provide binary outputs. In embodiments, restricted Boltzmann machines based on either Gaussian distributions or Beta distributions are described which are able to learn and model both the mean and variance of data. In some embodiments, a stack of restricted Boltzmann machines are connected in series with outputs of one restricted Boltzmann machine providing input to the next in the stack and so on. Embodiments describe how training the first machine in the stack may be carried out efficiently and the combined system used for one of a variety of applications such as data compression, object recognition, image processing, information retrieval, data analysis and the like.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image pre-processing system, the system described is provided as an example and not a limitation. As those skilled in the art will appreciate, the present examples are suitable for application in a variety of different types of data processing systems. A non-exhaustive list of examples is: data compression; data dimensionality reduction; object recognition; document retrieval; modeling gene expression data; modeling motion capture data; representing complex data.

Restricted Boltzmann machines (RBMs) are described in detail in Smolensky, 1986 "Information processing in dynamical systems: Foundations of harmony theory. In D. E. Rumelhart and J. L. McClelland (Eds.), Parallel distributed processing, vol. 1, chapter 6, 194-281. Cambridge: MIT Press," which is incorporated herein by reference in its entirety.

Figure 1:
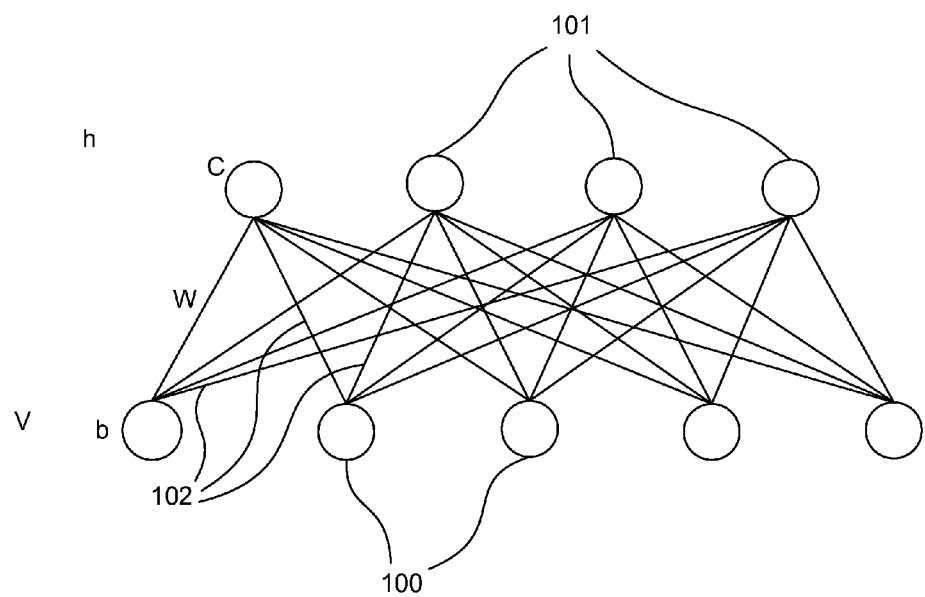
FIG. 1 is a schematic diagram of a restricted Boltzmann machine.

RBMs have one layer of visible units (input units) and one layer of hidden units with no visible-visible or hidden-hidden connections. The data processing systems described in the embodiments below store RBMs as a data structure in memory. FIG. 1 is a schematic diagram of part of such an RBM. Five visible units 100 are shown although many more of these are used in practice. A single layer of hidden units 101 is illustrated with each visible unit connected to each hidden unit using a connection 102 with weight w. The hidden units are represented by the symbol h and each has an associated bias c. The visible units are represented by the symbol v and each has an associated bias b. There are no direct connections between two hidden nodes or between two visible nodes.

The visible nodes may be thought of as those whose states may be observed whilst the hidden nodes have states which are not specified by the observed data. In the embodiments described herein the hidden units are used to learn binary features (latent variables) which capture higher-order structure in the input data.

RBMs are typically used for modeling binary input data. However, in the embodiments described herein, continuous, real-valued data is used as input. In the case of binary input data, a state vector is a binary vector with one value in the vector for each of the input nodes. In the case of continuous data, the state vector comprises a real value for each of the input nodes.

As mentioned above, an RBM is first trained using a set of training data (for example, hundreds of thousands of specified state vectors called training vectors) and using a suitable learning rule. During training the network eventually reaches an equilibrium in which the probability of a state vector is determined by an energy of that state vector relative to the energies of all possible state vectors, according to an energy function. The energy function, together with the weights and biases can be thought of as defining the relationships between the nodes. During training, the aim is to find weights and biases such that, with the given energy function, the training vectors have high probability.

It has unexpectedly been found as described herein that for continuous data, modifying an RBM to model the data variance leads to a much improved generative model of the data and in addition, that training is more reliable and stable. It has not previously been recognized that modifying RBMs to enable them to learn data variance may result in benefits. The term "generative model" is used to refer to a model for randomly generating observable data given some hidden parameters (in the examples herein the hidden parameters are the weights and biases of the RBM).

In order to enable an RBM to model data variance the energy function for the RBM is formulated in a new manner based on probability distributions such as Beta distributions or Gaussian distributions which are both able to model both the mean and the variance of continuous data. In the embodiments described herein the hidden units are arranged to be binary so that the neural network acts as a data processing system which takes continuous data and forms a binary value at each of the hidden nodes. This process is a valuable pre-processing stage for many data processing systems which require binary inputs but for which continuous data is available. The technical problem of quickly and accurately mapping the continuous data to binary values whilst preserving high-level structure in the data is difficult. Previous approaches to this problem have often produced inaccurate and poor representations of the input data and/or have been complex and time consuming to implement.

An RBM with n hidden units is a parametric model of the joint distribution between hidden variables $h_j$ (explanatory factors, collected in vector h) and observed variables $v_i$ (the observed data, collected in vector v), of the form $$P(v,h) \propto E^{-E(v,h)} = e^{v^T W h + b^T v - c^T h},$$

with parameters $\theta = (W, b, c)$ and $v_i, h_j \in \{0,1\}$. E(v,h) is called the energy of the state (v, h). Both conditional distributions P(v|h) and P(h|v) are factorial and thus easy to sample from. The marginal distributions can be easily computed up to a normalizing constant. Furthermore, one can also sample from the model distribution using Gibbs sampling.

Figure 2:
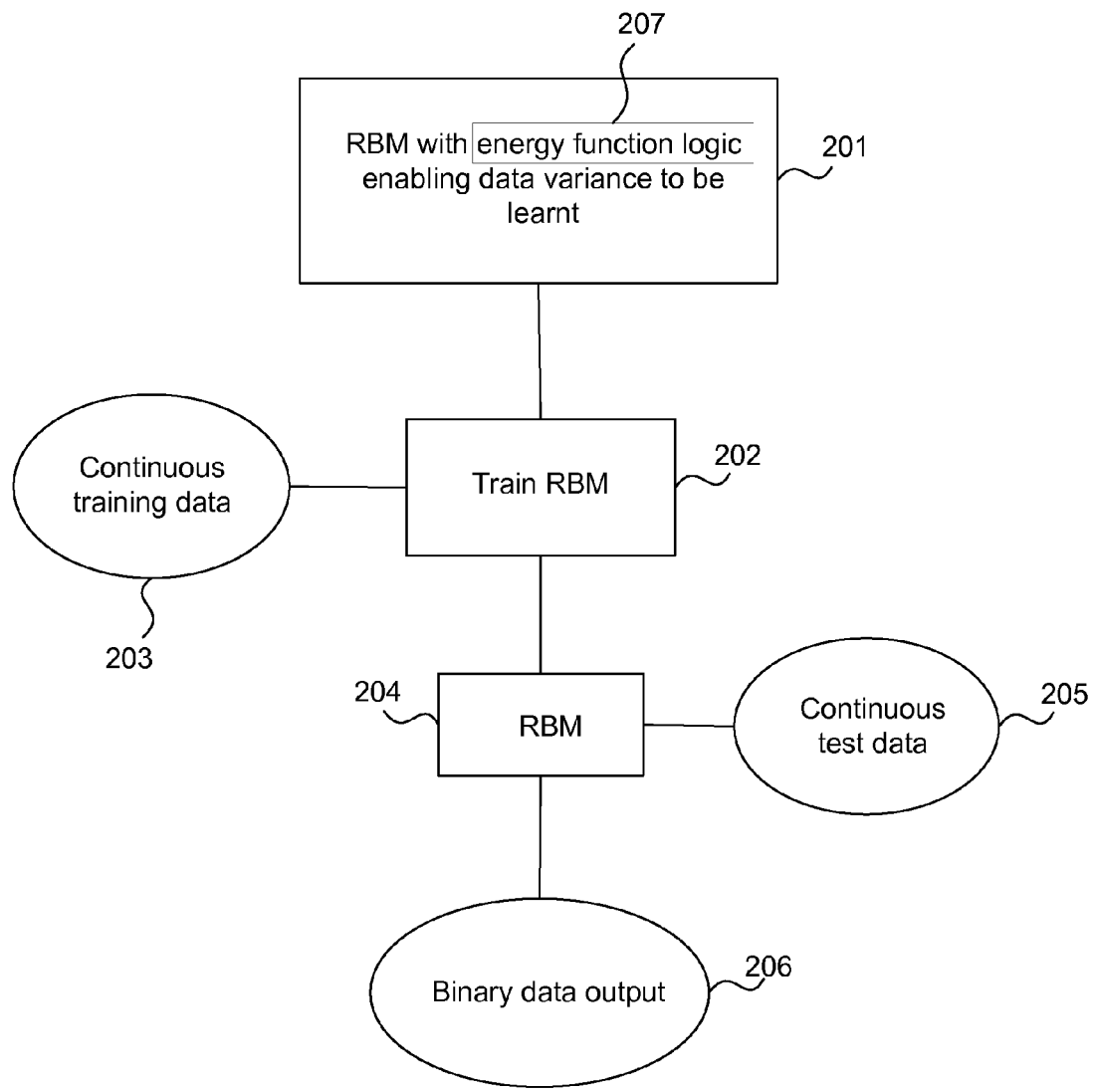
FIG. 2 is a flow diagram of a method of automatically transforming continuous data into binary outputs using a restricted Boltzmann machine.

FIG. 2 is a flow diagram of a method of automatically transforming continuous data into binary outputs whilst preserving information in the data. The method is not necessarily a 1 to 1 mapping as the number of outputs may be greater than (or less than) the number of input units. A data structure holding an RBM is provided 201 in memory such that the RBM has an energy function that enables variance of input data to be learnt. More detail about suitable energy functions is given below. For example, in some embodiments a Gaussian RBM is provided which uses the same hidden units to model both the mean of the input data and the precision of the input data (where precision is 1/variance). In other embodiments a Gaussian RBM is provided which uses some hidden units to model the mean of the data and different hidden units to model the precision of the data. In other embodiments a Beta RBM is provided. It is found that the Beta RBM embodiments provide particularly accurate models of input data and are suitable where lower and upper bounds on the data values are available. The Gaussian RBM embodiments may additionally be used where no such bounds are known.

In some embodiments the RBM is arranged to take continuous data as input. For example, this data may comprise 8 bit greyscale image data, with each input unit taking one of 256 possible values as input. In this case, it may be required to map the input values to binary output values. In another example, each input unit may take any value between 0 and 1 and the RGB may produce binary output.

In other embodiments the RBM is arranged to take discrete data as input such as binary values and to produce a different number of binary output values.

The RBM is trained 202 using training data 203 which is continuous and which is of a similar type to that required by the application which is to use the trained RBM. For example, if the RBM is to be used for image processing the training data may comprise hundreds of thousands of examples of image regions taken from images of landscapes. The resulting trained RBM may be used in an application for processing landscape images, or images of other types of scene such as images of people, interiors or faces. Any suitable training rule may be used such as gradient descent. Gradient descent with persistent contrastive divergence is described in detail in "Tieleman, 2008, Training restrictive Boltzmann machines using approximations to the likelihood gradient. Proc. ICML" which is incorporated herein by reference in its entirety.

The resulting trained RBM 204 may then be presented with test data 205 and is able to produce binary data output 206. This binary data output is provided by the activations at the hidden units of the RBM which result when the test data is presented to the trained RBM.

The binary data output may be stored and/or displayed as required. In addition it may be used as input to another process of any suitable type which requires binary input. By using the pre-processing stage of FIG. 2 important information in the data is retained whilst obtaining binary output in a form suitable for use by many processes. Once the training stage is complete the process of obtaining the binary data output from the test data is extremely fast and provides an accurate representation of the data given a fixed number of bits.

Because an RBM comprises a single layer of hidden units it is particularly efficient to train. In addition, RBMs may be stacked to create deep networks as described below.

In an embodiment the trained RBM is used to form an image compression system 301. As described with reference to FIG. 3 a digital color image 300 is provided as input to a Beta RBM 302 previously trained as described above. The binary outputs 303 of the Beta RBM are used as inputs to train another RBM 304 which itself provides outputs 305. This second RBM 304 may be able to learn variance in the data or may be a conventional type of RBM. The outputs 305 of the second RBM are used to train a third RBM and so on (as indicated by the dots in FIG. 3) until the output provided by a subsequent RBM is a compressed version 306 of the input image. The numbers of hidden units used at the various RBM layers are arranged to facilitate image compression.

Figure 3:
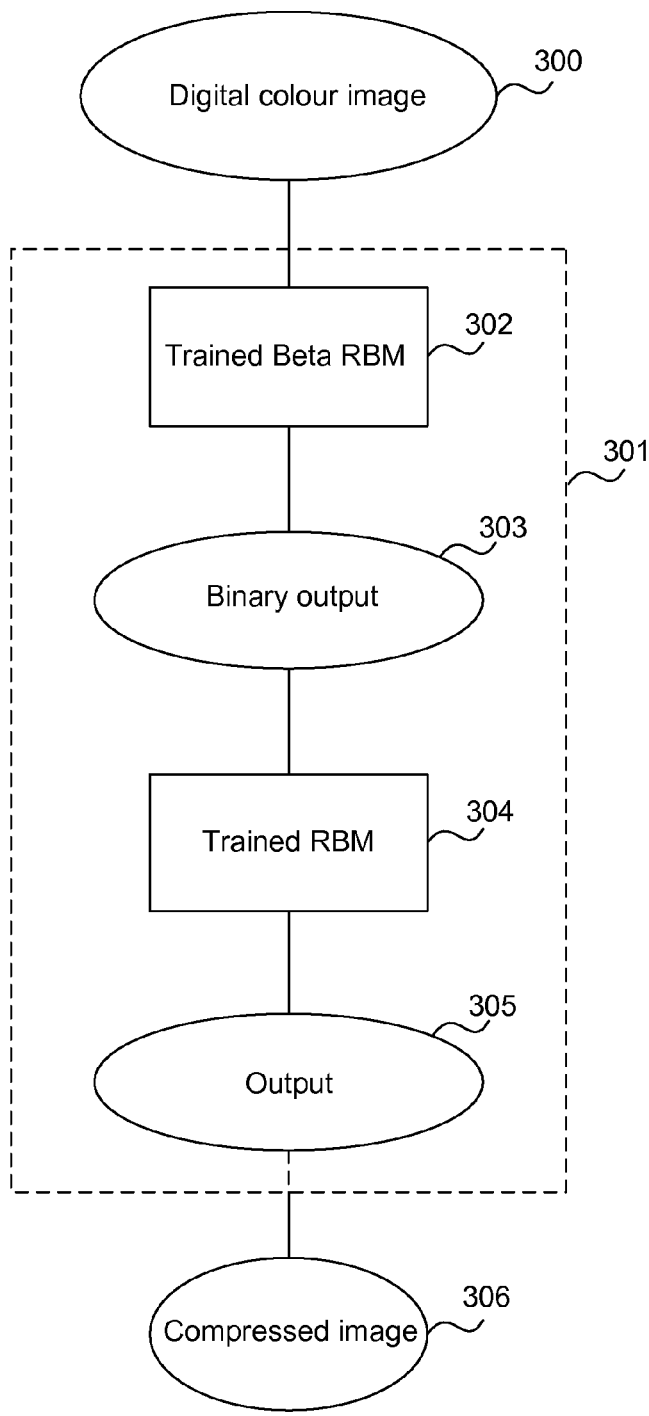
FIG. 3 is a schematic diagram of an image compression system.
Figure 4:
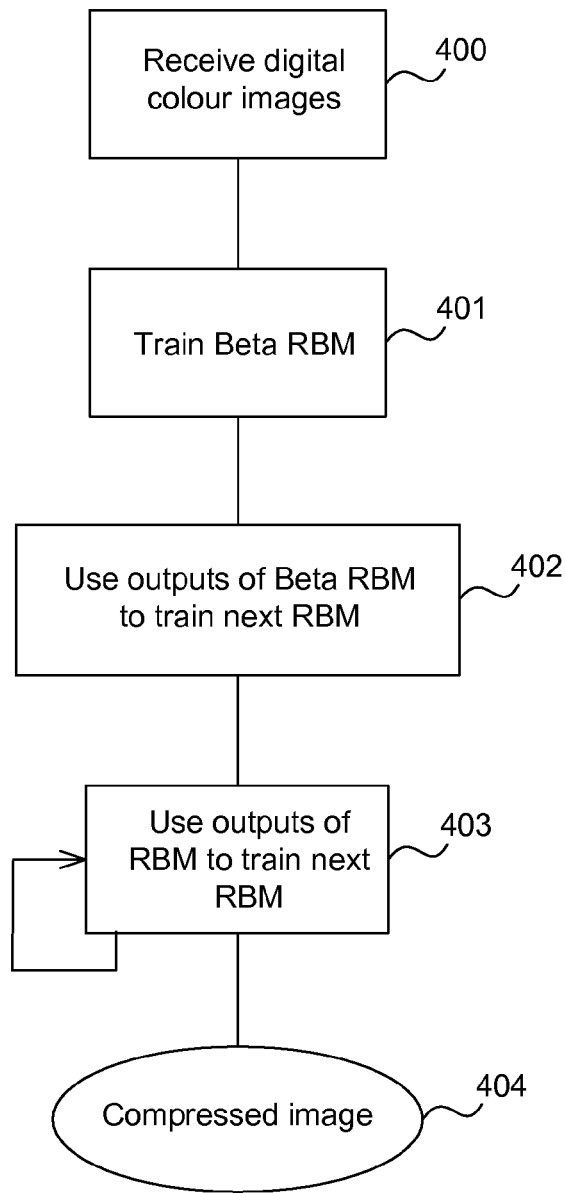
FIG. 4 is a flow diagram of a method of image compression.
Figure 5:
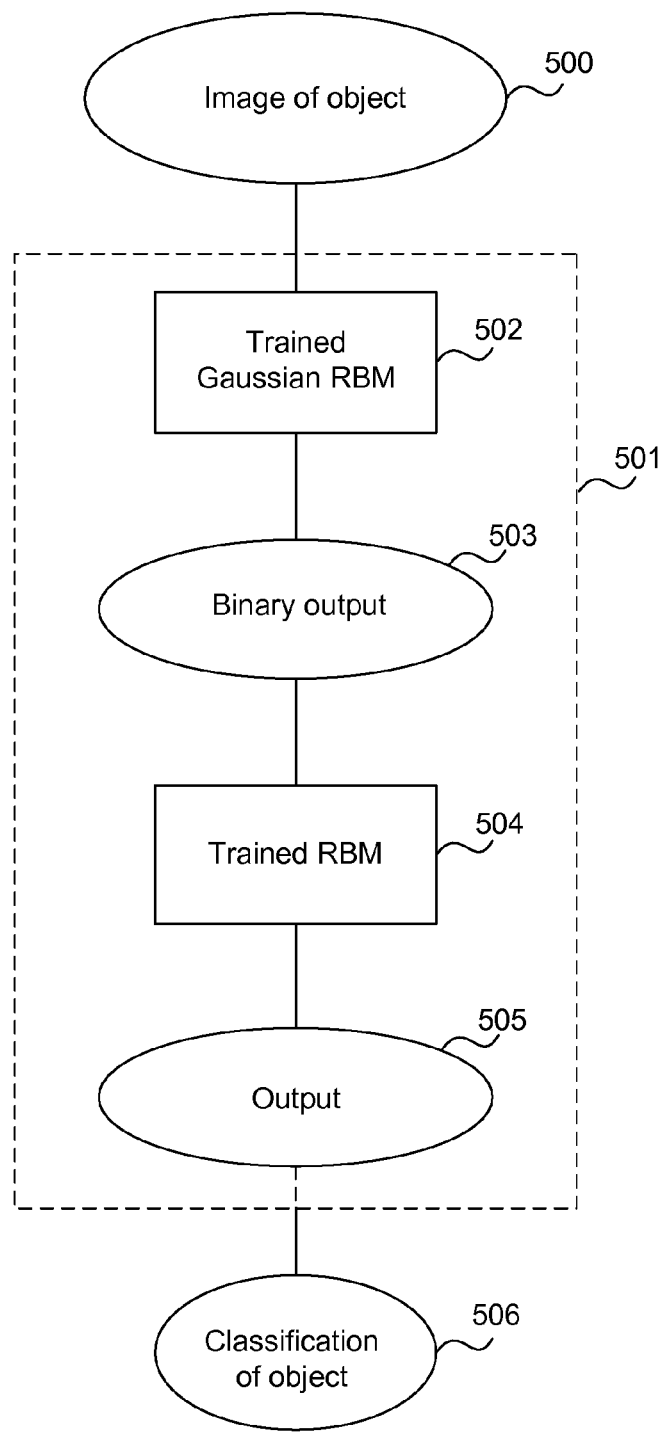
FIG. 5 is a schematic diagram of an object recognition system.

A method of forming the image compression system 301 of FIG. 3 is now described with reference to FIG. 4. Digital color images 400 are received and used to train a Beta RBM 401 as described above. The outputs of the Beta RBM are used to train another RBM 402 and the outputs are used to train a subsequent RBM 403. This process repeats for as many layers of RBM as are required until a compressed image 404 is obtained.

In another embodiment an object recognition system 501 is provided. Here an image of an object 500 is received and such data is used to train a Gaussian RBM 502. The binary output 503 of the Gaussian RBM is used to train another RBM 504 of any suitable type. Output is obtained and may be used to train another RBM and this process repeats for as many layers of RBM as are required. The final output provides a classification 506 of an object depicted in the input image 500.

More detail about the Gaussian RBM mentioned above, which uses the same hidden units to model mean and precision of the data is now given.

The energy function for this RBM represents the mean and precision jointly using a common set of hidden units:

$$E(v, h) = -v^T W^m h - (v^2)^T W^p h - v^T b^m - (v^2)^T b^p - c^T h$$

Denoting precision $\Lambda = -W^p h - b^p$, gives $$P(v_i | h) \sim N\left(\frac{W_{i,:}^m h + b_i^m}{2\Lambda_i}, \frac{1}{2\Lambda_i}\right).$$

More detail about the Gaussian RBM mentioned above which uses different hidden units to model mean and precision of the data is now given.

Here, the energy function uses one set of hidden units $h^m$ to model the mean, and a separate set of hidden units $h^p$ to model the precision:

$$E(v, h^m, h^p) =$$
$$-v^T W^m h^m - (v^2)^T W^p h^p - v^T b^m - (v^2)^T b^p - (c^m)^T h^m - (c^p)^T h^p$$

Denoting $\Lambda = -W^p h^p - b^p$, gives $$P(v_i | h^m, h^p) \sim N\left(\frac{W_{i,:}^m : h^m + b_i^m}{2\Lambda_i}, \frac{1}{2\Lambda_i}\right).$$

In another embodiment a Beta RBM is used. The Beta RBM is based on Beta distributions which also can model both the mean and the variance of continuous data. The main differences to the Gaussian RBM are that the Beta RBM requires that data values lie in a known range and in that it uses a different parameterization of the mean and variance.

The beta distribution is a continuous distribution over the range [0, 1] which has two parameters, $\alpha$ and $\beta$. Its probability density is defined as $$\text{Beta}(x | \alpha, \beta) = \frac{x^{\alpha-1}(1-x)^{\beta-1}}{\int_0^1 u^{\alpha-1}(1-u)^{\beta-1} du}$$

with $$E[X] = \frac{\alpha}{\alpha + \beta}$$

$$V[X] = \frac{\alpha\beta}{(\alpha + \beta)^2 (\alpha + \beta + 1)}$$

The energy function of a standard Beta RBM referred to herein as equation 1 is $$E(v, h) = -\log(v)^T Wh - \log(1-v)^T Uh -$$
$$(a-1)^T \log(v) - (b-1)^T \log(1-v) - c^T h.$$

There are twice as many parameters as in the standard RBM. This stems from the fact that the Beta RBM models the variance as well as the mean. Writing $\alpha_i = W_{i,:} h + a_i$, and $\beta_i = U_{i,:} h + b_i$, leads to the joint probability distribution $$P(v, h) \alpha \prod_i v_i^{\alpha_i - 1} (1 - v_i)^{\beta_i - 1} \exp(c^T h).$$

Both conditional distributions are factorial, but $$P(v | h) = \prod_i P(v_i | h) = \prod_i \text{Beta}(v_i | \alpha_i, \beta_i).$$

Therefore, ignoring the biases, the relative scale of the matrices W and U determines the mean of the Beta distribution whereas the absolute scale determines the variance.

It is found herein that using a standard Beta RBM in some practical applications is not straightforward and several technical problems are identified.

Redefining the Role of the Hidden Units

First, in the actual form of the energy function, $(\alpha_i | h_j = 1) = (\alpha_i | h_j = 0) + W_{i,j}$ (with a similar equality for $\beta_i$). Since the $\alpha_i$'s and $\beta_i$'s are to be positive for every value of h, this introduces complex constraints on the value of W. One could think that a simple constraint would be to enforce the positivity of the elements of W and U. It is found that such an approach lends to problems in some cases.

$\alpha_i$ and $\beta_i$ would always be greater when a hidden unit is on than when this same hidden unit is off. Looking at equation 1, this would mean that turning a hidden unit on can only increase the confidence in the visible values.

from an optimization point of view, all the visible units would have an inhibiting effect on h so that no visible units could vote in favour of the activation of a hidden unit.

In experiments, this led to a failure of the learning process. To address this the hidden units are configured differently. Instead of them defining an offset on the parameters of the beta distribution (that is the value of $\alpha_i$ and $\beta_i$ when $h_i$ is 1 is equal to the value of $\alpha_i$ and $\beta_i$ when $h_j$ is 0 plus an offset), it is considered that they lead to two unrelated pairs $(\alpha_i, \beta_i)$. The new every function this becomes:

$$E(v, h) = -\log(v)^T W^\alpha h - \log(v)^T U^\alpha (1-h) -$$
$$\log(1-v)^T W^\beta h - \log(1-v)^T U^\beta (1-h) + \log(v) + \log(1-v) - c^T h.$$

The elements in $W^\alpha$, $U^\alpha$, $W^\beta$ and $U^\beta$ are restricted to be positive, which can be done by setting to 0 all the values which would have otherwise been negative. Note that the visible biases can now be removed as they are equivalent to adding the same quantity in matrices $W^\alpha$ and $U^\alpha$ or $W^\beta$ and $U^\beta$.

Extending the Range of the Beta Distribution

Two issues remain with the standard Beta RBM: (i) 0 and 1 are special values for the beta distribution whereas they might not be in the practical application considered, and (ii) the value of the logarithm may be very high, resulting in saturation of the hidden units. To address these problems, the range of the Beta distribution is extended to $[-\lambda, 1+\lambda]$ giving $$Beta_\lambda(x \mid \alpha, \beta) = \frac{(x+\lambda)^{\alpha-1}(1+\lambda-x)^{\beta-1}}{\int_{-\lambda}^{1+\lambda}(u+\lambda)^{\alpha-1}(1+\lambda-u)^{\beta-1}du},$$

with $$E[X] = \frac{\alpha}{\alpha+\beta}(1+2\lambda) - \lambda$$

$$V[X] = \frac{\alpha\beta}{(\alpha+\beta)^2(\alpha+\beta+1)}(1+2\lambda)^2$$

The new energy function then becomes $$E(v, h) = -\log(v+\lambda)^T W^\alpha h - \log(v+\lambda)^T U^\alpha (1-h) - \log(1+\lambda-v)^T W^\beta h -$$
$$\log(1+\lambda-v)^T U^\beta (1-h) + \log(v+\lambda) + \log(1+\lambda-v) - c^T h.$$

Setting $\lambda$ to a smaller value speeds up training but increased the chances of divergence as values close to the boundaries are more likely. Conversely, setting $\lambda$ to a larger value drastically slows down the training as all the data are concentrated around the middle part of the Beta distribution, affording much less flexibility in the shape of the distribution.

In an embodiment the system of FIG. 2 is used as a pre-processing system for image data. For this embodiment, the continuous training data 203 comprises, for example, around 400,000 color image patches of size 16 pixels by 16 pixels. The image patches are extracted on a regular 16×16 grid from large object recognition image databases. Red, blue and green channels are concatenated so that the RBM has 768 visible units (256×3).

The RBM is trained using gradient descent with persistent contrastive divergence. A small weight decay is used as mentioned below and the learning rate is decreased every epoch (where one epoch is one run through all training patches). For example, the weight decay and decrease constant are manually set at 0.0002 and 0.0001 respectively. However, any other suitable values may be used. In some embodiments, the learning rate may be optimized using a validation set of image patches. For example, the learning rate that gives the best log-likelihood of the data given the inferred latent variables after one epoch may be selected. After selecting the optimal learning rate, the RBM may be trained for 20 epochs, in batches of size 50 patches. The hidden layer may comprise any suitable number of hidden nodes, such as 256, 512 or 1024 hidden units. The hidden units provide binary valued outputs and the trained RBM thus enables continuous image patch data to be transformed into binary valued outputs without losing high level structure in the data.

After training the RBM 204 may be assessed by taking samples of the activations of the hidden units. It is also possible to consider "filter images" learned by the RBM where a filter image is obtained by setting one hidden unit on and computing either the mean or precision of P(v|h), subtracting off in each case the filter image due to the biases one would get with all hidden units turned off. These filter images may then be normalized to [0,1].

It has been found that by using RBMs arranged to learn variance in the data as described herein improved performance is obtained as compared with using conventional RBMs which are unable to learn variance in the data. For example, precision "image filters" for the Gaussian and Beta RBMs gave a higher degree of structure as compared with conventional RBMs. Also, the embodiments described herein gave a more accurate model of the mean of image patch data as compared with conventional RBMs. In addition, the embodiments described herein gave a better imputation performance than conventional RBMs. Imputation involves filling in missing pixels in test patches in the following manner:

Given a test patch, randomly select a region of 1×1, 2×2 or 4×4 pixels and consider these pixels to be missing.

Initialize the missing pixels to the mean of the observed pixels, and

Perform 16 bottom-up and top-down passes to impute the values of the missing pixels. In each top-down pass, the values of the observed pixels are fixed whilst the values of the missing pixels are sampled from P(v|h).

In the Beta RBM embodiments described herein any suitable value of $\lambda$ may be used as discussed above. For example, this value may be set in the range 0.1 to 2. In one embodiment, $\lambda$ is set to $(\sqrt{5}-1)/2$.

Figure 6:
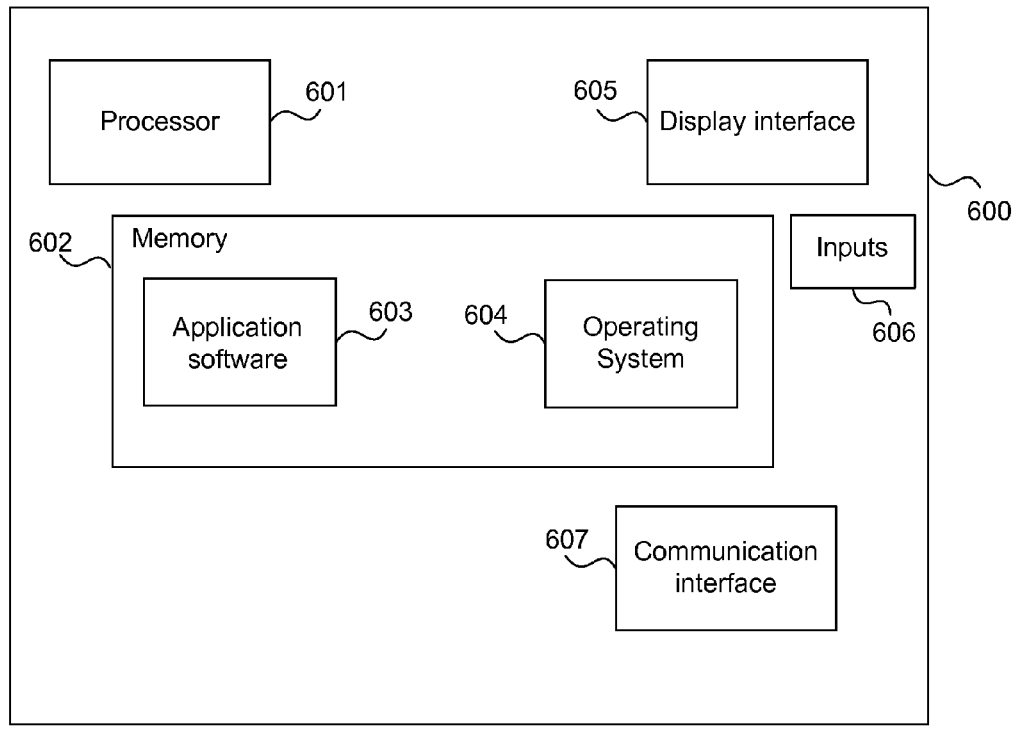
FIG. 6 illustrates an exemplary computing-based device in which embodiments of a data processing system using a restricted Boltzmann machine may be implemented.

FIG. 6 illustrates various components of an exemplary computing-based device 600 which may be implemented as any form of a computing and/or electronic device, and in which embodiments of a data processing system using a restricted Boltzmann machine may be implemented.

The computing-based device 600 comprises one or more inputs 606 which are of any suitable type for receiving media content, Internet Protocol (IP) input, digital images, documents, gene expression data, continuous data or other data to be processed using a restricted Boltzmann machine. The device also comprises communication interface 607 which is optional and enables the device to communicate with other entities over a communications network.

Computing-based device 600 also comprises one or more processors 601 which may be microprocessors, controllers or any other suitable type of processors for processing computing executable instructions to control the operation of the device in order to process data using one or more restricted Boltzmann machines. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface via a display interface 605, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of pre-processing data to produce binary output comprising:
forming and storing a data structure holding a restricted Boltzmann machine based on Beta distributions and having a plurality of visible units connected using links to a plurality of binary hidden units, each link being a relationship between two units;
specifying the relationships between the units using an energy function logic which enables both mean and variance of the data to be modeled;
training the restricted Boltzmann machine using a training set of the data such that at least mean and variance of the data is learnt; and
presenting at least some of the data to the trained restricted Boltzmann machine and obtaining binary output being activations of the hidden units.

2. A method as claimed in claim 1 wherein the data is continuous.

3. A method as claimed in claim 1 wherein the step of storing the data structure comprises storing a data structure holding a restricted Boltzmann machine based on Gaussian distributions.

4. A method as claimed in claim 3 wherein the step of specifying the relationships comprises using an energy function logic wherein each hidden unit represents both a mean and a precision of the data.

5. A method as claimed in claim 3 wherein the step of specifying the relationships comprises using an energy function logic wherein a first set of the hidden units represents a mean of the data and a second set, which has no units in common with the first set, represents a precision of the data.

6. A method as claimed in claim 1 which further comprises storing in the data structure a weight associated with each link and a bias associated with each unit and updating those weights and biases during the training step and wherein the method comprises setting to zero any of the weights and biases which become negative during training.

7. A method as claimed in claim 1 which further comprises arranging the data structure to hold the restricted Boltzmann machine such that the data is scaled.

8. A method as claimed in claim 1 which further comprises forming and storing a second data structure holding a second restricted Boltzmann machine and providing the binary outputs as input to the second restricted Boltzmann machine.

9. A data pre-processing apparatus comprising:
- a memory storing a data structure holding a restricted Boltzmann machine based on Beta distributions and having a plurality of visible units connected using links to a plurality of binary hidden units, each link being a relationship between two units;
- an energy function logic arranged to specify the relationships between the units in a manner which enables both mean and variance of the data to be modeled;
- a processor arranged to train the restricted Boltzmann machine using a training set of the data such that at least variance in the data is learnt;
- the processor also arranged to present at least some of the data to the trained restricted Boltzmann machine to obtain binary output being activations of the hidden units; and wherein the processor is arranged to set to zero any parameters of the restricted Boltzmann machine which fall below zero during training.

10. An apparatus as claimed in claim 9 wherein the apparatus is arranged to pre-process continuous data to produce the binary valued outputs.

11. An apparatus as claimed in claim 9 wherein the memory is arranged to store the data structure such that the restricted Boltzmann machine scales the data.

12. An apparatus as claimed in claim 9 wherein the memory holds a second data structure providing a second restricted Boltzmann machine and wherein the processor is arranged to provide the binary outputs of the first restricted Boltzmann machine as inputs to the second restricted Boltzmann machine.

13. An apparatus as claimed in claim 9 wherein the memory holds a plurality of data structures each holding a restricted Boltzmann machine those machines being connected in series with the outputs of one restricted Boltzmann machine providing inputs to another restricted Boltzmann machine and wherein the apparatus is arranged to provide any of: a data compression system; an object recognition system; an information retrieval system; a motion capture data modeling system; a gene expression data modeling system.

14. A data pre-processing apparatus comprising:
- a memory storing a data structure holding a restricted Boltzmann machine based on Beta distributions and having a plurality of visible units connected using links to a plurality of binary hidden units, each link being a relationship between two units;
- an energy function logic arranged to specify the relationships between the units in a manner which enables both mean and variance of the data to be modeled;
- a processor arranged to train the restricted Boltzmann machine using a training set of the data such that at least variance in the data is learnt; the processor also arranged to present at least some of the data to the trained restricted Boltzmann machine to obtain binary output being activations of the hidden units.

15. An apparatus as claimed in claim 14 which is arranged to process continuous data and provide binary outputs.

16. An apparatus as claimed in claim 14 wherein the memory stores the data structure holding a restricted Boltzmann machine based on Gaussian distributions.

17. An apparatus as claimed in claim 16 wherein the energy function logic is arranged such that each hidden unit represents both a mean and a precision of the data.

18. An apparatus as claimed in claim 16 wherein the energy function logic is arranged such that a first set of the hidden units represents a mean of the data and a second set, which has no units in common with the first set, represents a precision of the data.

* * * * *